(12) United States Patent
Dharmaji

(10) Patent No.: US 8,677,395 B2
(45) Date of Patent: Mar. 18, 2014

(54) METHOD AND APPARATUS FOR OPERATING A MICRO-SPLICER TO INSERT ALTERNATE CONTENT WHILE VIEWING MULTIMEDIA CONTENT ON A HANDHELD DEVICE

(75) Inventor: Srinivasa Dharmaji, Cupertino, CA (US)

(73) Assignee: Goldspot Media, Inc., Sunnyvale, CA (US)

( * ) Notice: Subject to any disclaimer, the term of this patent is extended or adjusted under 35 U.S.C. 154(b) by 231 days.

(21) Appl. No.: 12/881,011

(22) Filed: Sep. 13, 2010

(65) Prior Publication Data

US 2011/0004892 A1 Jan. 6, 2011

Related U.S. Application Data

(63) Continuation-in-part of application No. 11/828,204, filed on Jul. 25, 2007.

(60) Provisional application No. 60/834,039, filed on Jul. 29, 2006.

(51) Int. Cl.
*H04N 7/025* (2006.01)
*H04N 7/10* (2006.01)

(52) U.S. Cl.
USPC ............... 725/32; 725/33; 725/34; 725/35; 725/36

(58) Field of Classification Search
USPC ............... 725/32–36; 455/404.1, 414.1
See application file for complete search history.

(56) References Cited

U.S. PATENT DOCUMENTS

| 5,155,591 | A | | 10/1992 | Wachob |
| 5,319,455 | A | | 6/1994 | Hoarty et al. |
| 5,874,986 | A | | 2/1999 | Gibbon et al. |
| 5,907,321 | A | | 5/1999 | Grossman et al. |
| 6,006,257 | A | * | 12/1999 | Slezak ........................... 725/110 |
| 6,446,261 | B1 | | 9/2002 | Rosser |
| 6,698,020 | B1 | * | 2/2004 | Zigmond et al. ................ 725/34 |
| 6,820,277 | B1 | | 11/2004 | Eldering et al. |
| 6,834,195 | B2 | | 12/2004 | Brandenberg et al. |
| 6,880,123 | B1 | | 4/2005 | Landsman et al. |
| 6,977,667 | B1 | | 12/2005 | Burke |

(Continued)

OTHER PUBLICATIONS

The Int'l Search Report and Written Opinion, mailed Aug. 12, 2008, for related PCT patent application PCT/US07/74472, 12 pages.

(Continued)

*Primary Examiner* — Mulugeta Mengesha
(74) *Attorney, Agent, or Firm* — Michael A. Glenn; Perkins Coie LLP

(57) ABSTRACT

In a targeted advertising system focused advertisements or alternate content is pre-stored on a handheld device, inserted into a multimedia stream at predefined times and points in the content stream for a predefined interval, otherwise referred to as a spot. A micro-splicer, instantiated on a handheld device, enables alternate content rendering, instead of the original program content, at available advertisement spots during program content viewing. The micro-splicer uses metadata to identify the correct alternate content and display it in the correct spot. The micro-splicer also enables switching the display back to the multimedia program content after the end of the alternate content. User viewing and interaction with the alternate content is ensured by instructing the micro-splicer to switch back to multimedia program content only after receipt of predefined user feedback.

16 Claims, 9 Drawing Sheets

(56) References Cited

U.S. PATENT DOCUMENTS

| | | | |
|---|---|---|---|
| 6,990,630 B2 | 1/2006 | Landsman et al. | |
| 7,028,327 B1 | 4/2006 | Dougherty et al. | |
| 7,068,719 B2 | 6/2006 | Lin et al. | |
| 7,093,277 B2 * | 8/2006 | Perlman | 725/142 |
| 7,103,904 B1 | 9/2006 | Blackketter et al. | |
| 7,149,958 B2 | 12/2006 | Landsman et al. | |
| 7,152,237 B2 | 12/2006 | Flickinger et al. | |
| 7,155,663 B2 | 12/2006 | Landsman et al. | |
| 7,185,353 B2 | 2/2007 | Schlack | |
| 7,228,555 B2 | 6/2007 | Schlack | |
| 7,376,414 B2 * | 5/2008 | Engstrom | 455/414.3 |
| 7,720,432 B1 | 5/2010 | Colby et al. | |
| 2001/0025378 A1 | 9/2001 | Sakamoto et al. | |
| 2002/0092019 A1 | 7/2002 | Marcus | |
| 2002/0103919 A1 | 8/2002 | Hannaway | |
| 2002/0144263 A1 | 10/2002 | Eldering et al. | |
| 2002/0194592 A1 | 12/2002 | Tsuchida et al. | |
| 2003/0033157 A1 | 2/2003 | Dempski et al. | |
| 2003/0149975 A1 | 8/2003 | Eldering et al. | |
| 2003/0163810 A1 | 8/2003 | Iijima et al. | |
| 2004/0003398 A1 | 1/2004 | Donian et al. | |
| 2004/0015608 A1 | 1/2004 | Elis et al. | |
| 2004/0025174 A1 * | 2/2004 | Cerrato | 725/9 |
| 2004/0111465 A1 | 6/2004 | Chuang et al. | |
| 2004/0123097 A1 | 6/2004 | Ranjan | |
| 2004/0158865 A1 | 8/2004 | Kubler et al. | |
| 2004/0171399 A1 | 9/2004 | Uchida et al. | |
| 2004/0194131 A1 | 9/2004 | Ellis et al. | |
| 2004/0244035 A1 | 12/2004 | Wright et al. | |
| 2005/0050577 A1 | 3/2005 | Westbrook | |
| 2005/0097624 A1 | 5/2005 | Salo et al. | |
| 2005/0107109 A1 | 5/2005 | Gunaratnam et al. | |
| 2005/0245241 A1 | 11/2005 | Durand et al. | |
| 2006/0100928 A1 | 5/2006 | Walczak, Jr. et al. | |
| 2006/0130119 A1 | 6/2006 | Candelore et al. | |
| 2006/0130121 A1 | 6/2006 | Candelore et al. | |
| 2006/0168616 A1 | 7/2006 | Candelore | |
| 2007/0055985 A1 | 3/2007 | Schiller et al. | |
| 2007/0061203 A1 | 3/2007 | Elis et al. | |
| 2007/0061204 A1 | 3/2007 | Elis et al. | |
| 2007/0079325 A1 * | 4/2007 | de Heer | 725/32 |
| 2007/0113243 A1 * | 5/2007 | Brey | 725/32 |
| 2007/0157231 A1 | 7/2007 | Eldering et al. | |
| 2008/0040743 A1 | 2/2008 | Dharmaji | |
| 2008/0192736 A1 | 8/2008 | Jabri et al. | |
| 2008/0195664 A1 | 8/2008 | Maharajh et al. | |
| 2008/0201225 A1 | 8/2008 | Maharajh et al. | |
| 2008/0207137 A1 | 8/2008 | Maharajh et al. | |
| 2009/0076904 A1 | 3/2009 | Serena | |
| 2009/0204487 A1 | 8/2009 | Cansler et al. | |
| 2009/0319375 A1 | 12/2009 | Dharmaji | |

OTHER PUBLICATIONS

The Int'l Preliminary Report on Patentability, mailed Feb. 12, 2009, for related PCT patent application No. PCT/US07/74472, 9 pages.
The Int'l Preliminary Report on Patentability, mailed Mar. 5, 2009, for related PCT patent application No. PCT/US07/76537, 6 pages.
The Int'l Search Report and Written Opinion, mailed Jul. 28, 2008, for related PCT patent application No. PCT/US07/76537, 12 pages.
The Int'l Preliminary Report on Patentability, mailed Mar. 5, 2009, for related PCT patent application No. PCT/US07/76539, 8 pages.
The Int'l Search Report and Written Opinion, mailed Aug. 8, 2008, for related PCT patent application No. PCT/US07/76539, 12 pages.
The Int'l Search Report and Written Opinion, mailed Sep. 21, 2009, for related PCT patent application No. PCT/US09/53610, 11 pages.
Int'l Search Report And Written Opinion, mailed Dec. 17, 2010, for related PCT patent application No. PCT/US10/54423, 16 pages.

* cited by examiner

METHOD AND APPARATUS FOR OPERATING A MICRO-SPLICER TO INSERT ALTERNATE CONTENT WHILE VIEWING MULTIMEDIA CONTENT ON A HANDHELD DEVICE

CROSS REFERENCE TO RELATED APPLICATIONS

This application is a continuation-in-part of U.S. patent application Ser. No. 11/828,204, filed Jul. 25, 2007, entitled Micro-Splicer for Inserting Alternate Content to a Content Stream on a Hand Held Device, which application claims priority to U.S. provisional patent application Ser. No. 60/834,039, filed Jul. 29, 2006, entitled Micro-Splicer in Mobile Device, both of which are assigned to a common assignee, and both of which are incorporated herein by this reference thereto.

BACKGROUND OF THE INVENTION

1. Technical Field

The invention relates to the insertion of advertisements and alternate content into multimedia content while viewing said multimedia content. More specifically, the invention relates to the insertion of advertisements and other alternate content at predefined spots within a multimedia content and, even more specifically, the invention relates to the rendering of focused advertisements and alternate content for viewing by a target audience on a handheld device.

2. Description of the Background Art

The availability and growth of use of handheld, portable, and mobile devices (generally referred to herein as handheld devices), such as a personal digital assistant (PDA) and a cell phone, are revolutionizing the experience individuals have when viewing digital multimedia content. Because each handheld device is specific to an individual, it is possible to personalize and focus advertisements, and other alternate content, to specific individuals, or groups of individuals, using targeted characteristics. Ideally, the advertisement for each individual should be tailored, or otherwise targeted, to fit the specific requirements of that specific individual. Therefore, it is preferable to provide each individual with specific advertisements.

One problem that exists today in implementing such a scheme is that there is limited bandwidth available in systems, such as those used in the point-to-point or multicast wireless broadcasting of digital multimedia content. Therefore, it is impractical to provide each individual with a specifically targeted stream that fits that individual's characteristics. This limits the possibility of targeting focused advertisements and alternate content towards specific individuals or groups. This is due to the fact that in such a case there are a substantial number of focused advertisements that must be broadcast simultaneously to achieve the objective of focused advertising. In addition, each user of the handheld device must be capable of identifying and viewing the alternate content or advertisement that is specifically meant for that individual. Hence, even though the idea of providing focused advertisements and alternate content to target groups has been a desirable concept in the advertising to customers using handheld devices, it has not been possible to implement efficiently.

The current practice for providing advertisements and alternate content for viewing on handheld devices is to insert them into the content supplied to the handheld device for viewing. The user of the handheld device is able to view the content and the inserted alternate content or advertisement when viewing the content either live or as stored and played back.

It would therefore be advantageous to provide a method and an apparatus for displaying advertisements and/or alternate content on a handheld device, based on characteristics of an individual or a group of individuals. It would be further advantageous if such a solution ensured that the user viewed and interacted with the advertisement or alternate content while viewing the multimedia content.

SUMMARY OF THE INVENTION

In a targeted advertising system focused advertisements or alternate content is pre-stored on a handheld device, inserted into a multimedia stream at predefined times and points in the content stream for a predefined interval, otherwise referred to as a spot. A micro-splicer, instantiated on a handheld device, enables alternate content rendering, instead of the original program content, at available advertisement spots during program content viewing. The micro-splicer uses metadata to identify the correct alternate content and display it in the correct spot. The micro-splicer also enables switching the display back to the multimedia program content after the end of the alternate content. User viewing and interaction with the alternate content is ensured by instructing the micro-splicer to switch back to multimedia program content only after receipt of predefined user feedback.

DETAILED DESCRIPTION OF THE INVENTION

Figure 1:
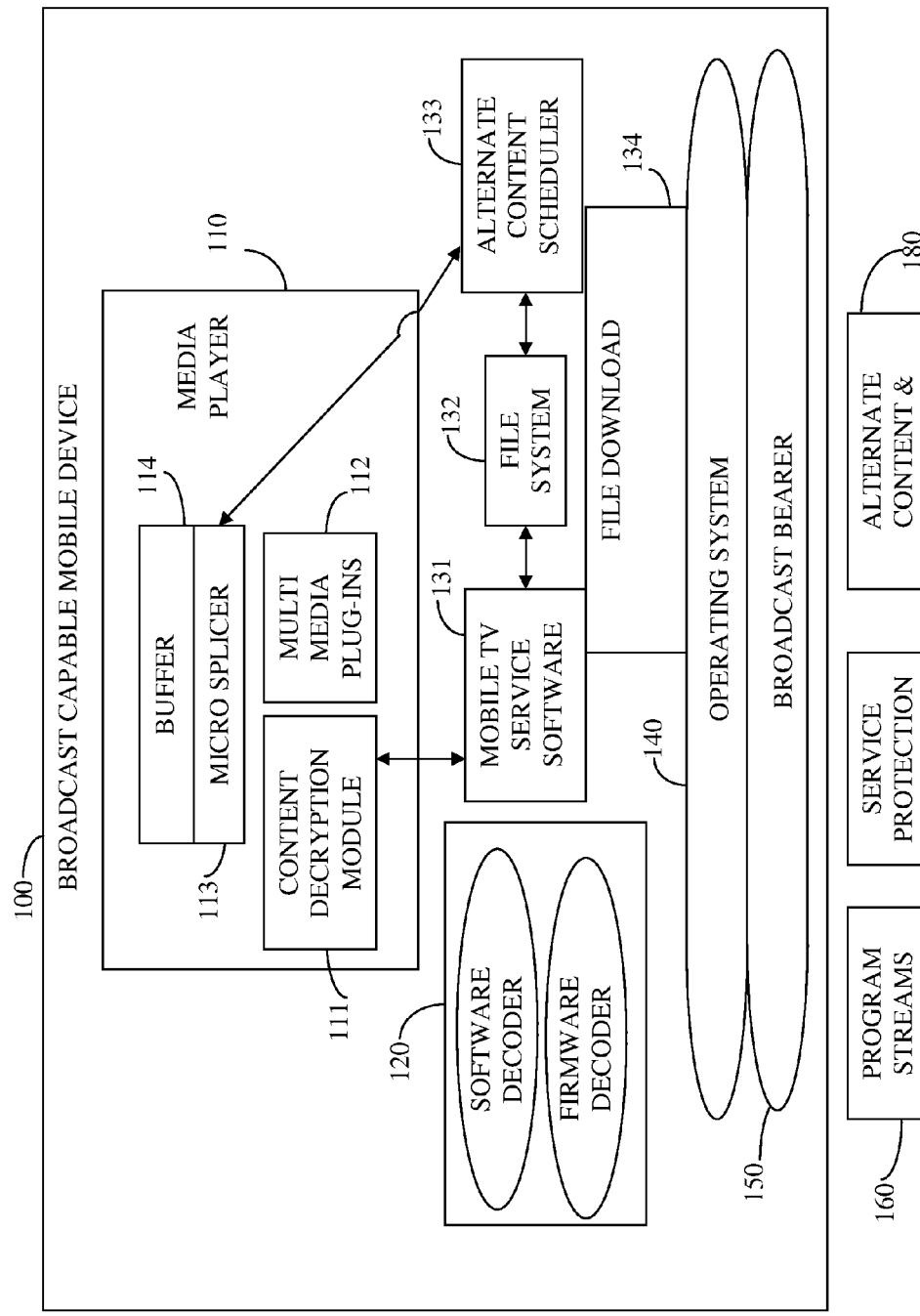
FIG. 1 is a block schematic diagram showing entities participating in micro-splicing according to the invention.

In a targeted advertising system, focused advertisements or alternate content is pre-stored on a handheld device, and inserted into a multimedia stream at predefined times and points in the content stream for a predefined interval, otherwise referred to as a spot. A micro-splicer, instantiated on a handheld device, enables alternate content rendering, instead of the original program content, at available advertisement spots during program content viewing. The micro-splicer uses metadata to identify the correct alternate content and to display the alternate content in the correct spot. The micro-splicer also switches the display back to the multimedia program content after the end of the alternate content. User viewing and interaction with the alternate content is ensured by instructing the micro-splicer to switch back to multimedia program content only after receipt of predefined user feedback.

An apparatus for targeted advertising pre-stores focused advertisements or alternate content on a handheld device and inserts the advertisements or alternate content into a multimedia stream at predefined times and points in content stream for a predefined interval, otherwise referred to as a spot. A micro-splicer, instantiated on a handheld device, enables alternate content insertion into a content buffer, instead of the original content stream, at available advertisement spots during content viewing. The alternate content for a target audience can be downloaded and stored on a handheld device for insertion into the content stream at the available spots. The content can be viewed live on the handheld device or stored, based on available storage capability, on the handheld device, for viewing when the handheld device has no connection to the Web. The micro-splicer uses metadata, within the content stream or notified by other means, to identify the correct alternate content and insert it into the correct spot for reproduction on the handheld device.

More specifically, an embodiment of the invention comprises a method and apparatus for inserting alternate digital content into a multimedia content stream that is directed to mobile portable devices in a system with synchronization where applicable. The disclosed micro-splicer can be used as the basis for inserting digital content, such as advertisements, preference based content, banners, public announcements, and emergency notifications etc, into a multimedia content stream at a spot during the viewing process. This disclosed method does not alter the original multimedia content stream. Rather, it stops the rendering of the multimedia content from the content buffer and replaces it with alternate content from an alternate content buffer at the advertisement spot for a specified period, as defined by metadata supplied to the micro-splicer. At the end of the period, as indicated by the metadata, the micro-splicer stops rendering the alternate content from the alternate content buffer and restarts rendering the multimedia content from the content buffer.

The micro-splicing capability instantiated on a mobile handheld device inserts forced, preference or profile based, focused, alternate content, or focused advertisements to be rendered by the mobile media player. This insertion is done, at the available spot, for the identified period of time based on metadata that is typically made available with the multimedia content.

In accordance with an embodiment of the disclosed invention, the alternate content is transferred and stored on the handheld device along with synchronization metadata. This synchronization metadata defines the exact period and synchronization information for alternate content buffering and rendering. Alternate content with synchronization metadata can hence be streamed through other transport mechanisms, such as cellular data networks, Wi-Fi networks, or any other mobile device input/output mechanism. When the advertisement spot and advertisement identification metadata is identified within the multimedia content, it is recognized and the alternate content is synchronized, based on the synchronization metadata, at the handheld device. The micro-splicer decrypts the encrypted alternate content metadata within the content stream to detect a spot break related message. Based on the detected message, a command is provided to stop rendering the multimedia content with a further command (switch/inlay/overlay) to insert the alternate content, and the mobile media player is instructed to start rendering the alternate content from an alternate content buffer. The micro-splicer switches back to the original program, multimedia content stream once the alternate content has been fully rendered.

The micro-splicer stops and restarts the rendering of multimedia content or the alternate content based on inputs and stimulus provided. These may be metadata and/or any other external commands, such as from user interaction with the display unit. This capability can be used to ensure that there is active viewing and interaction by the user with alternate content during the display period of the alternate content. An indication of an interaction of the user with the advertisement or content can be used with the end of spot metadata to restart the rendering of multimedia content. In this embodiment, an interaction of the user with the displayed alternate content on the handheld device generates a user interaction signal that, in turn, provides a user feedback signal to the micro-splicer. The user feedback signal unlocks the switching action of the micro-splicer and enables the micro-splicer to switch back to display the multimedia content based on the appropriate metadata. The use of feedback generated by user interaction ensures that the user has viewed the advertisement or alternate content and has had an interaction with it before moving on to viewing the balance of the multimedia content. Such a capability, based on user interaction when implemented using the micro-splicer, guarantees that the user has viewed the alternate content or advertisement during viewing of the multimedia content and that the advertiser may be charged for such impression. Any interaction of the user with the alternate content can also be used to evaluate and understand the user preferences, as described in U.S. patent application Ser. No. 12/191,086, filed on Aug. 13, 2008, assigned to common assignee, and which application is incorporated herein in its entirety by this reference thereto.

Although the method of transmission of the advertisement may vary depending on the transport characteristics of wireless data or broadcast networks, insertion of advertisement or alternate content is dependent on tight coupling of a micro-splicer and an alternate content scheduler that also resides on the handheld device. Inserting gateway, interstitial, bumper, or banner advertisements in the content buffer is an example of this interaction. The disclosed micro-splicing is the action of switching the loading of the display content buffer from the multimedia or content buffer to the alternate content buffer and back to the multimedia content buffer. This is done mainly based on the deciphered and decrypted metadata provided with the alternate content and the metadata indicating the spot and alternate content identification that is provided with the incoming content stream. Additional external inputs can be used in conjunction with the metadata provided to further control the switching as described before.

The disclosed micro-splicing hence refers to the inserting of alternate content into the content buffer of the mobile media player. It refers to a splicing-like interaction on the mobile handheld device similar to that of ANSI/SCTE 30 (Digital Program Insertion) specifications. But, unlike the splicing in the digital cable specifications, there is no insertion of alternate content streams in place of original content streams. Rather, the media player rendering the original program content switches to the data in the alternate content buffer when metadata signaling for content switching occurs.

Once the alternate content has been rendered in the advertisement spot and other set conditions have been met, the micro-splicer switches the media player back to the original media content stream without loss of content.

Because the processing power of a mobile handheld device is limited and any additional processing is battery intensive, the micro-splicer should not excessively consume processing cycles. To achieve this result, the micro-splicer must function in tandem with the alternate content scheduler on the handheld device to detect content switch instructions within the metadata obtained through the transport channels. The micro-splicer typically works with a hardware or a software de-multiplexer to obtain information on program switching. One exemplary solution for micro-splicing provides notifications from the demultiplexer to the micro-splicer of events recognized in the program stream during decryption. This, in turn, enables the micro-splicer to prepare and insert alternate content or content for insertion into the stream for display.

FIG. 1 is an exemplary and non-limiting illustration of the entities participating in micro-splicing in accordance with the disclosed invention. The main entity blocks of the micro-splicing architecture of a mobile handheld device 100 are the alternate content scheduler 133 and the micro-splicer 113. The alternate content scheduler 133 receives alternate content and related metadata 180. The alternate content scheduler 133 helps synchronize content switching on the mobile handheld device by notifying the micro-splicer 113 of the impending spot break or program switch/inlay/overlay command for inserting alternate content.

Synchronization can also be aided by notifications from the micro-splicer 113 to the alternate content scheduler 133 upon detecting metadata periodically from the content streams, such as cue tones, e.g. ANSI 30, or other metadata. In such cases, the alternate content scheduler 133 prepares the received multimedia content or the appropriate locally stored multimedia content, and stored the alternate content to be rendered on the display 115 for display based on the metadata instructions.

Typically, the micro-splicer 113 acts as a thin pipe in the mobile media player 110 architecture. Multimedia streams 160 are received and decrypted in the content decryption module 111 and are fed into the multimedia content buffer which is part of a content buffer 114 through the micro-splicer 113. Where applicable, a second part of this content buffer may be used to store the multimedia content. In normal cases, the multimedia content from the content buffer is rendered for display. When the notification arrives from the alternate content scheduler 133 with details of the impending switch in content, the micro-splicer 113 starts buffering the alternate content in the alternate content buffer, which is also a part of the content buffer 114. Depending on the type of alternate content insertion performed, the micro-splicer 113 also starts parsing the decrypted multimedia content streams to detect spot break related messages, e.g. either a cue message or a proprietary command. Decryption of the program is done in the content decrypting module 111.

Alternate content metadata in the multimedia content, such as cue tones, may also be presented as a separate control stream to the handheld device. In such case, the micro-splicer 113 decrypts the metadata using the spot owner's supplied keys and notifies the alternate content scheduler 133. Typically, these metadata events are provided prior to the actual time when content switching is to be performed for alternate content insertion. This time period is used by the alternate content scheduler 133 to pre-buffer the alternate content and decode it in advance, so that the user can be presented with a synchronized alternate content viewing experience. Upon detection of switching instructions, the micro-splicer 113 instructs the mobile media player 110 to start rendering the alternate content from the next buffer 114. The micro-splicer 113, in tandem with the alternate content scheduler 133, switches back to the original program streams once the alternate content has been rendered and other command conditions are satisfied. The proper inbuilt or downloaded plug-ins are present in the media player.

When a mobile multimedia content service is enabled for the mobile handheld device, a service library on the mobile handheld device conveys the IP address and port to receive the content to the mobile media player. The micro-splicer 113 conveys the metadata information received to the alternate content scheduler library for any multimedia content program specific alternate content insertion. This type of message allows choosing between different alternate content insertion scenarios. The assumptions for all of the message flows described in this section are:

- A mobile TV application/service 131 is available on the mobile handheld device and a broadcast network enabled for mobile TV service 80 (see FIG. 2) delivery to mobile devices.
- The mobile media player has the micro-splicer 113 component integrated with the framework.
- The alternate content scheduler software library is installed within the alternate content scheduler 133 on the mobile device.
- The alternate content scheduler software library stores the alternate content and corresponding metadata obtained from broadcast or unicast channel on the mobile device file system prior to any insertion.
- If the alternate content or associated spot metadata is encrypted, the alternate content scheduler uses the alternate content inventory ownership and rules to acquire keys required for decryption.
- The micro-splicer 113 uses the decoder component 120 on the mobile device (software or firmware) to decode alternate content before rendering.

Several possible scenarios exist for insertion of differing content types using the micro-splicer 113. In each and every case, the micro-splicer 113 looks for metadata input regarding the content and also the metadata on the advertisement space availability and inserts alternate content stored in the alternate content buffer. This is done by changing the content insertion path to the content buffer 114 from the program content flow, as instructed by the alternate content scheduler 133. At the end of the advertisement space, defined by the metadata, the micro-splicer 113 redirects the path of insertion from the alternate content buffer to the program content flow again under instruction from the scheduler 133. Hence, the micro-splicer performs the insert operation by redirecting the input path to the content buffer from the program content flow to the alternate content buffer and back at the appropriate points in the display stream based on the metadata inputs received and decoded in the mobile portable device 100.

Six exemplary scenarios that exist within this framework are:
- Alternate content insertion for interstitial content.
- Alternate content insertion for gateway content.
- Alternate content insertion for bumper content.
- Alternate content insertion for overlay or inlay content.
- Alternate content insertion for forced content.
- No alternate content insertion scenario.

Each of these scenarios shall be now explained in more detail. These scenarios and descriptions thereof are provided as exemplary embodiments of the disclosed invention and are not intended to be viewed as a limitation on the scope of the disclosed invention.

Figure 2:
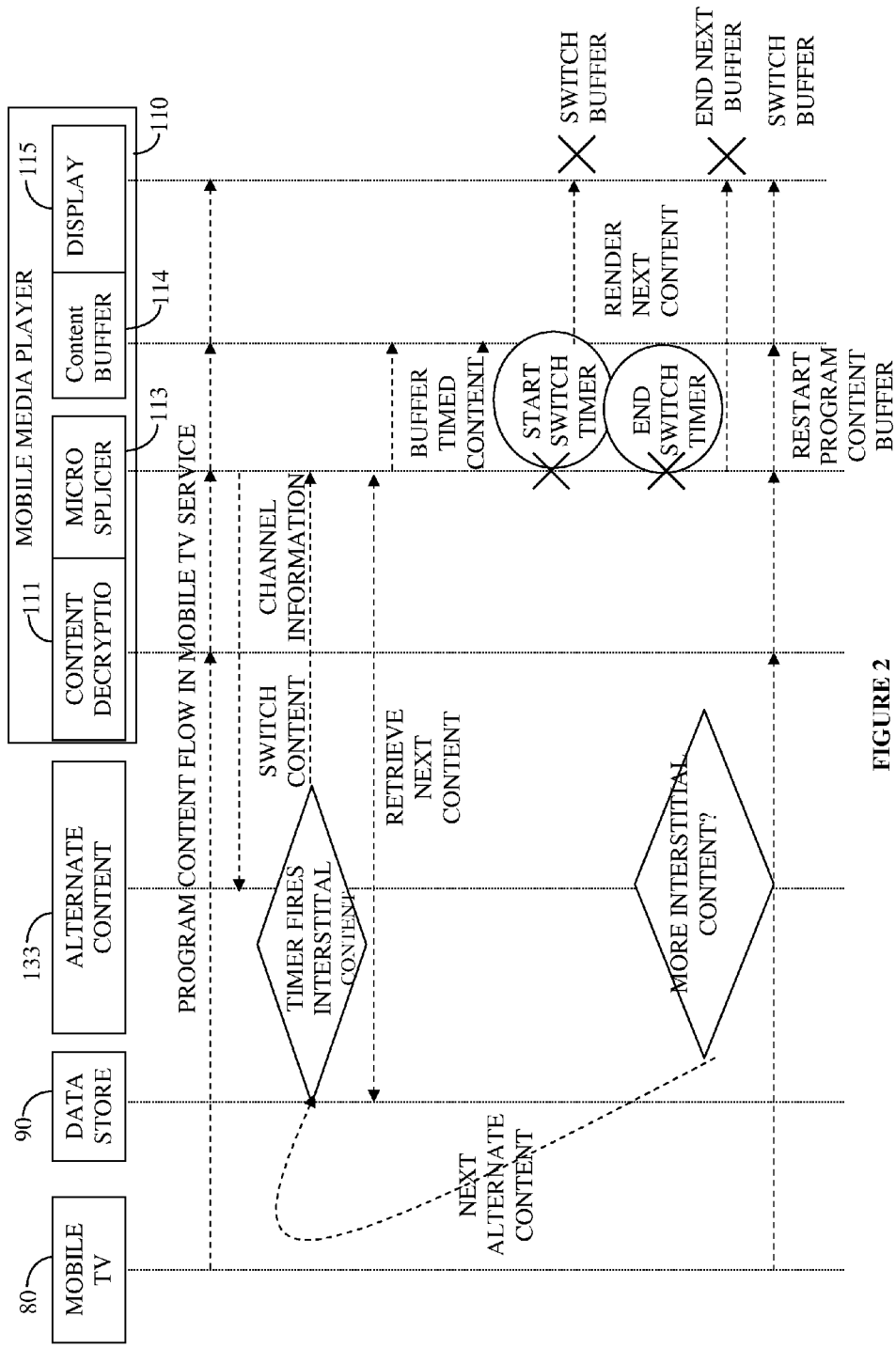
FIG. 2 is a flow diagram showing a scheme for alternate content insertion for interstitial content according to the invention.

FIG. 2 is an exemplary and non-limiting illustration of an alternate content insertion for interstitial content according to the invention.

1. Program content is received by the broadcast/unicast chipset of the mobile handheld device.
2. The mobile TV service library 80 informs the media player 110 of the IP address/port to listen for the program streams.
3. After a service protection scheme is enforced on the mobile device, the decrypted program streams are sent to the micro-splicer 113 to be buffered in buffer 114.
4. The mobile media player 110 renders and displays 115 the program streams.
5. The micro-splicer 113 informs the alternate content scheduler 133 library of the program stream being played and the associated data.
6. The alternate content scheduler 133 library obtains the channel information through interaction with mobile TV 80 software library, if necessary.
7. An internal timer for interstitial content fires, and the alternate content scheduler 133 library informs the micro-splicer 113 of an impending command for program switch and of the location (URL) of the alternate content that must to be rendered.
8. The micro-splicer 113 starts parsing the program streams for commands to switch content.
9. The micro-splicer 113 starts buffering the alternate content from the specified location on the mobile handheld device.
10. Upon detection of the alternate content rendering command, the micro-splicer 113 stops buffering the original program stream.
11. The micro-splicer 113 directs the rendering component of the mobile media player to display the buffered alternate content, and notifies the alternate content scheduler 133.
12. The alternate content scheduler 133 starts a timer upon notification for a duration minus X units of the pre-stored content being rendered.
13. Upon firing of timer for rendering alternate content, if there is more alternate content, Steps 6 though 12 above are repeated.
14. If all scheduled alternate content is played, the scheduler 133 notifies the micro-splicer 113 to start re-buffering original program content.
15. The micro-splicer 113 starts buffering of the original program stream.
16. When the end timer for alternate content fires, the scheduler 113 notifies the micro-splicer to switch buffer.
17. The micro-splicer 113 instructs the rendering engine (not shown) of the mobile media player 110 to start original program content display.

Figure 3:
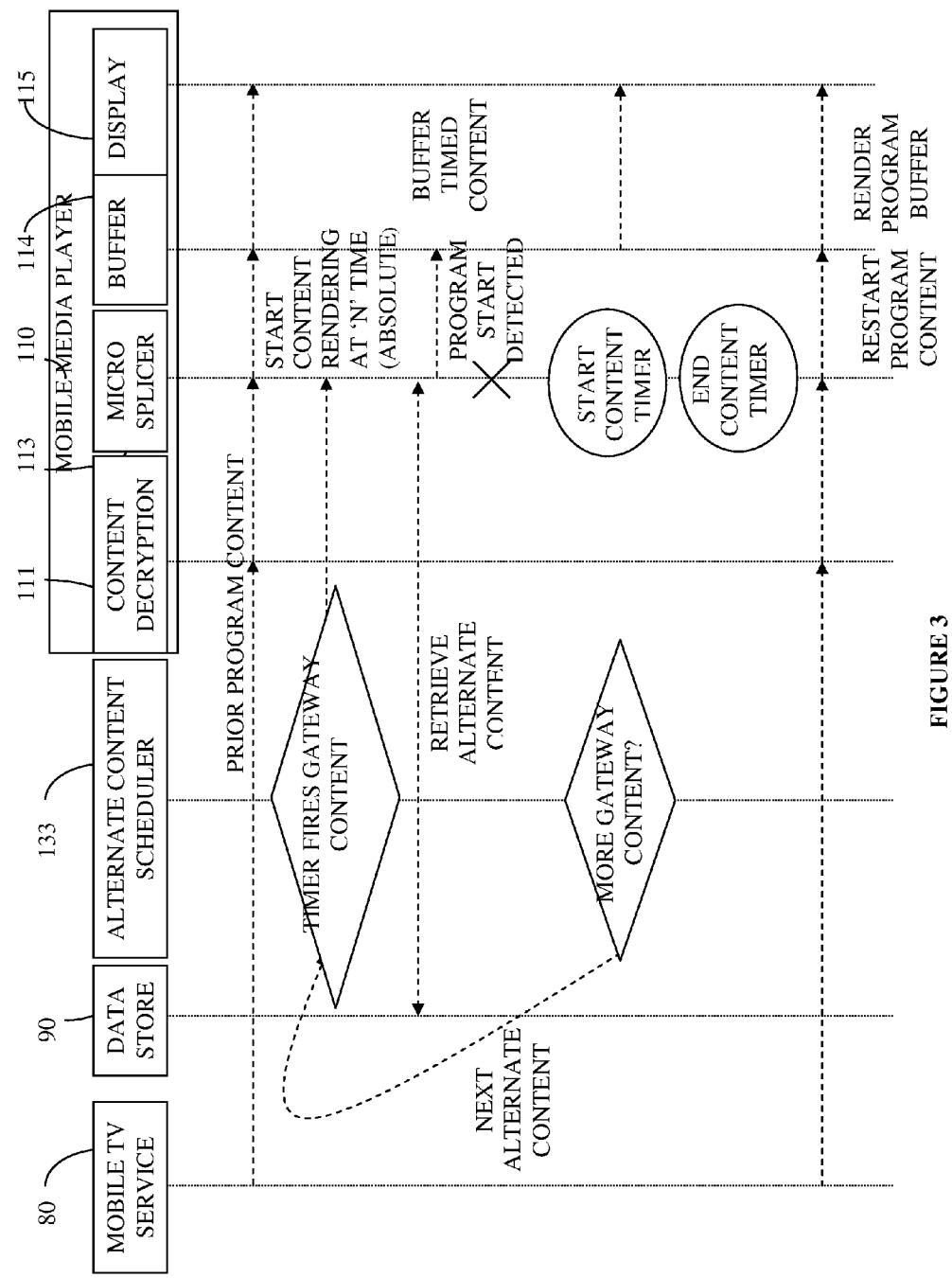
FIG. 3 is a flow diagram showing a scheme for alternate content insertion for gateway content according to the invention.

FIG. 3 is an exemplary and non-limiting illustration of an alternate content insertion for gateway content according to the invention. The alternate content scheduler 133 has information on the currently viewed program and channel of the mobile handheld device. Gateway content is the alternate content that is displayed before the start of a program. Typically, messages or content from entities, e.g. sponsored media, that sponsor the program are displayed.

1. The mobile media player renders prior program content.
2. The alternate content scheduler 133 detects the impending program start and commands the micro-splicer 113 to start rendering alternate content after time N.
3. The micro-splicer 113 retrieves the alternate content from the local file store provided in the previous step.
4. The alternate content is buffered in buffer 114.
5. The micro-splicer 113 starts looking for a program start command and detects same in the program content stream.
6. The micro-splicer 113 notifies the alternate content scheduler 133 when the program start command is detected.
7. The alternate content scheduler 133 starts an internal timer upon notification.
8. X-units before program end, the scheduler 133, determines if there is any more alternate content to be rendered.
9. Steps 1 through 8 above are repeated until all alternate gateway content is rendered.
10. If all alternate gateway content is played, the scheduler 133 notifies the micro-splicer 113 to restart buffering the original program content.
11. The micro-splicer 113 starts buffering the original program content.
12. When the end timer for alternate content fires, the scheduler 133 notifies the micro-splicer 113 to switch buffer 114.
13. The micro-splicer 113 instructs the rendering component of mobile media player 110 to start the original program content display.

Figure 4:
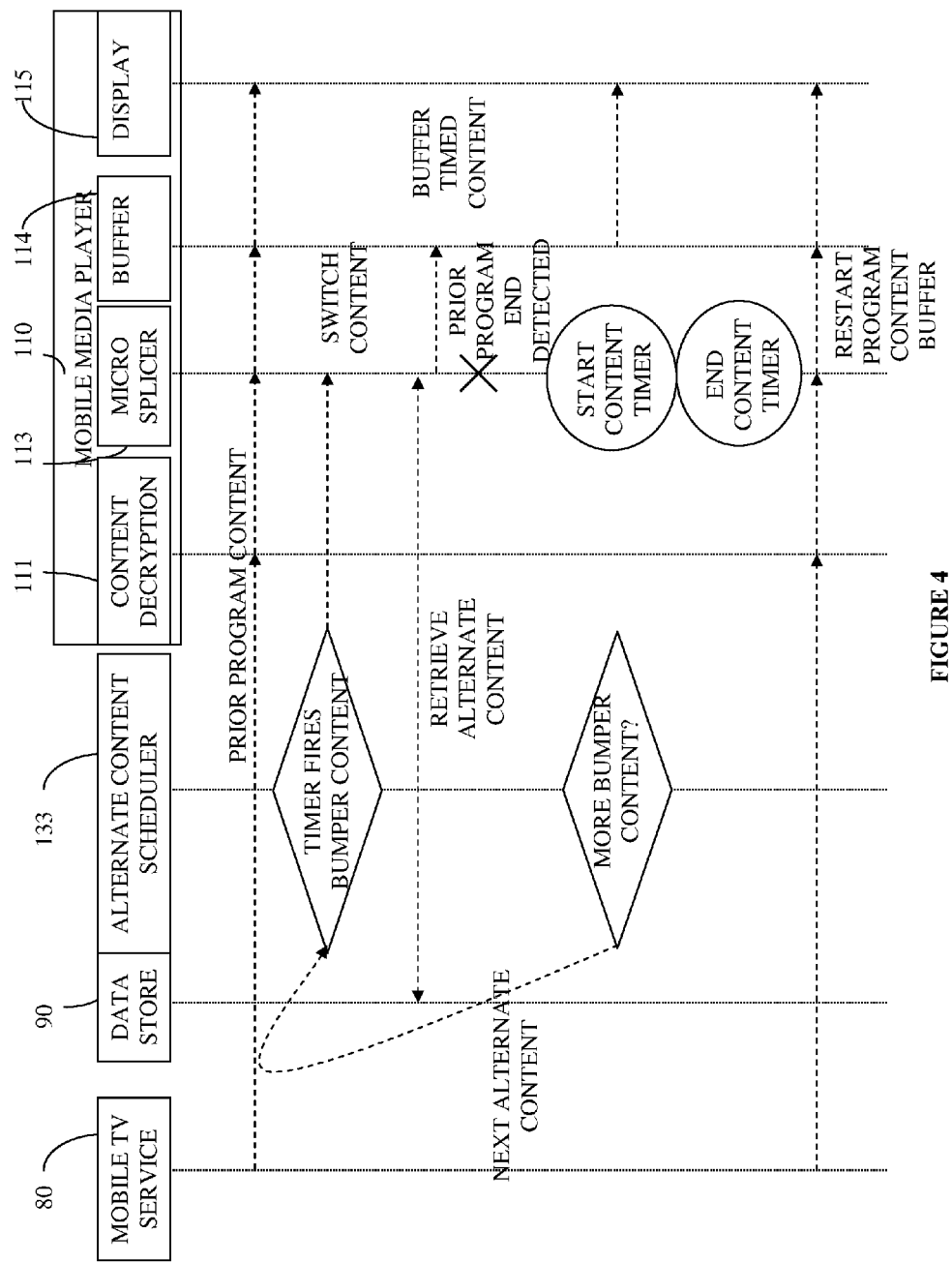
FIG. 4 is flow a diagram showing a scheme for alternate content insertion for bumper content according to the invention.

FIG. 4 is an exemplary and non-limiting illustration of an alternate content insertion for bumper content according to the invention. The assumptions for alternate content insertion bumper content are that the alternate content scheduler 133 has the information on currently viewed program and channel on the mobile handheld device, and that the bumper content is the alternate content that is displayed at the end of programs. Typically, messages or content from entities, e.g. sponsored media, that sponsor the program are displayed. The operation is then as follows:

1. The mobile media player 110 renders prior program content.
2. The alternate content scheduler 133 detects the impending program end and commands the micro-splicer 113 to start rendering alternate content.
3. The micro-splicer 113 retrieves the alternate content from the URL provided in the previous step.
4. The alternate content is buffered in the buffer 114.
5. The micro-splicer 113 starts looking for a program end command or metadata and detects it in the program content stream.
6. The micro-splicer 113 commands the rendering component to start displaying the buffered alternate content on display 115 and notifies the scheduler 133.
7. The alternate content scheduler 133 starts an internal timer upon notification 8. X-units before program end, the scheduler 133 determines if there is any more alternate content to be rendered.
9. Steps 1 through 8 above are repeated until all alternate gateway content is rendered.
10. If all alternate gateway content is played, the scheduler 133 notifies the micro-splicer 113 to restart buffering the original program content.
11. The micro-splicer 113 starts re-buffering the original program content.
12. When the end timer for alternate content fires, the scheduler 133 notifies the micro-splicer 113 to switch to buffer 114.

13. The micro-splicer 113 instructs the rendering component of the mobile media player 110 to display the original program content the display 115.

Figure 5:
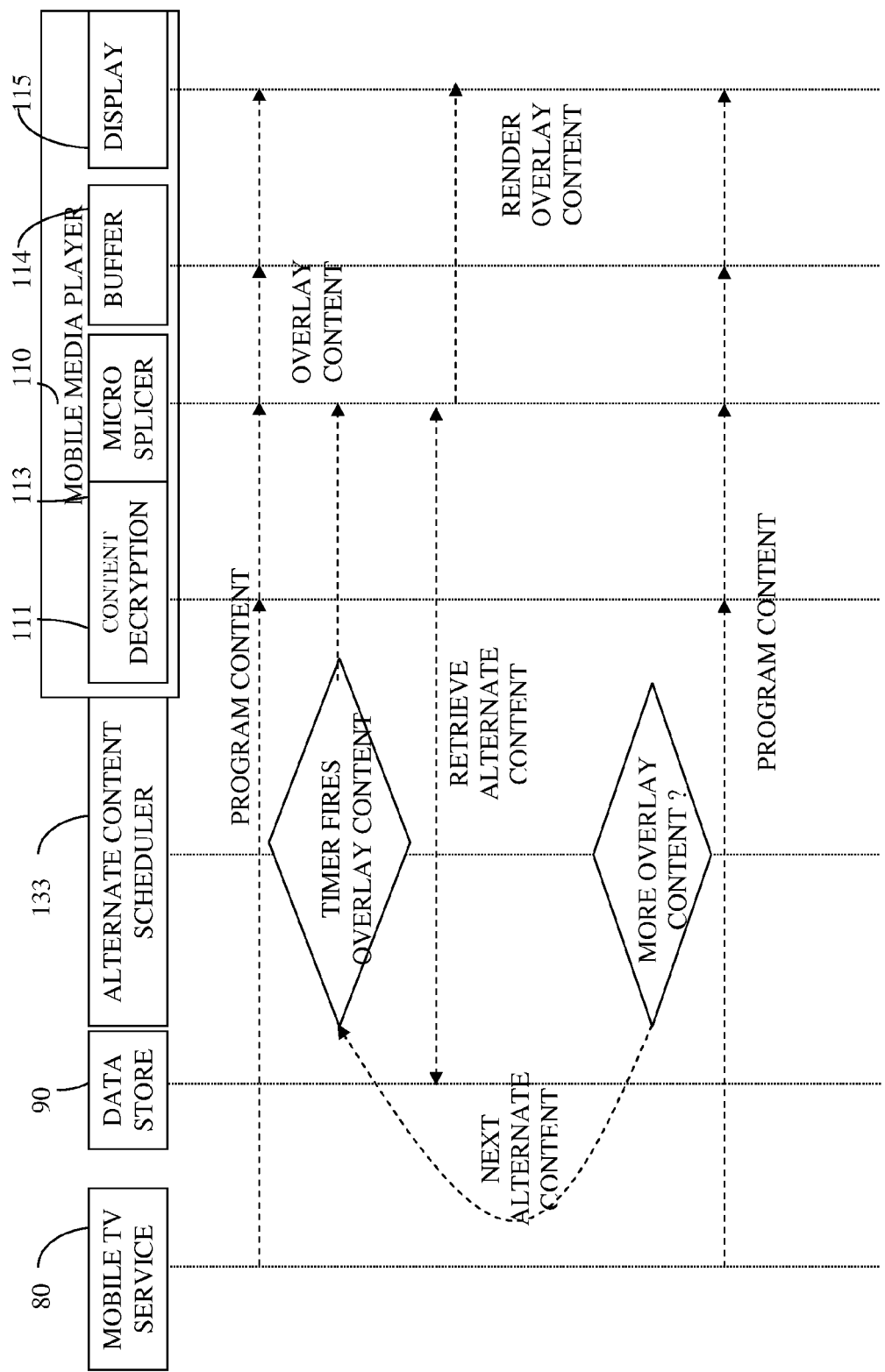
FIG. 5 is a flow diagram showing a scheme for alternate content insertion for overlay or inlay content according to the invention.

FIG. 5 is an exemplary and non-limiting illustration of an alternate content insertion for overlay or inlay content according to the invention. The assumptions for alternate content insertion for overlay or inlay content is that the alternate content scheduler 133 has information on the currently viewed program and channel on the mobile device. Typical examples of this type of content include banners, text messages, pictures, etc, which are rendered in a small portion of the display screen for inlay, and which occupy the entire screen for overlays.

1. The mobile media player 110 renders prior program content.
2. The alternate content scheduler 133 detects a time for content overlay or inlay and commands the micro-splicer 113 to start rendering alternate content and display the content on the display 115 per rules obtained from the network.
3. The micro-splicer 113 retrieves the alternate content from the URL provided in the previous step.
4. The alternate content is buffered to the buffer 114.
5. The micro-splicer 113 instructs the rendering engine of the mobile media player to overlay or inlay content while enforcing the display rules obtained in Step 1 above.
6. Steps 1 through 4 above are repeated until all alternate overlay or inlay content is rendered.
7. The mobile media player 110 continues rendering the original program content.

Figure 6:
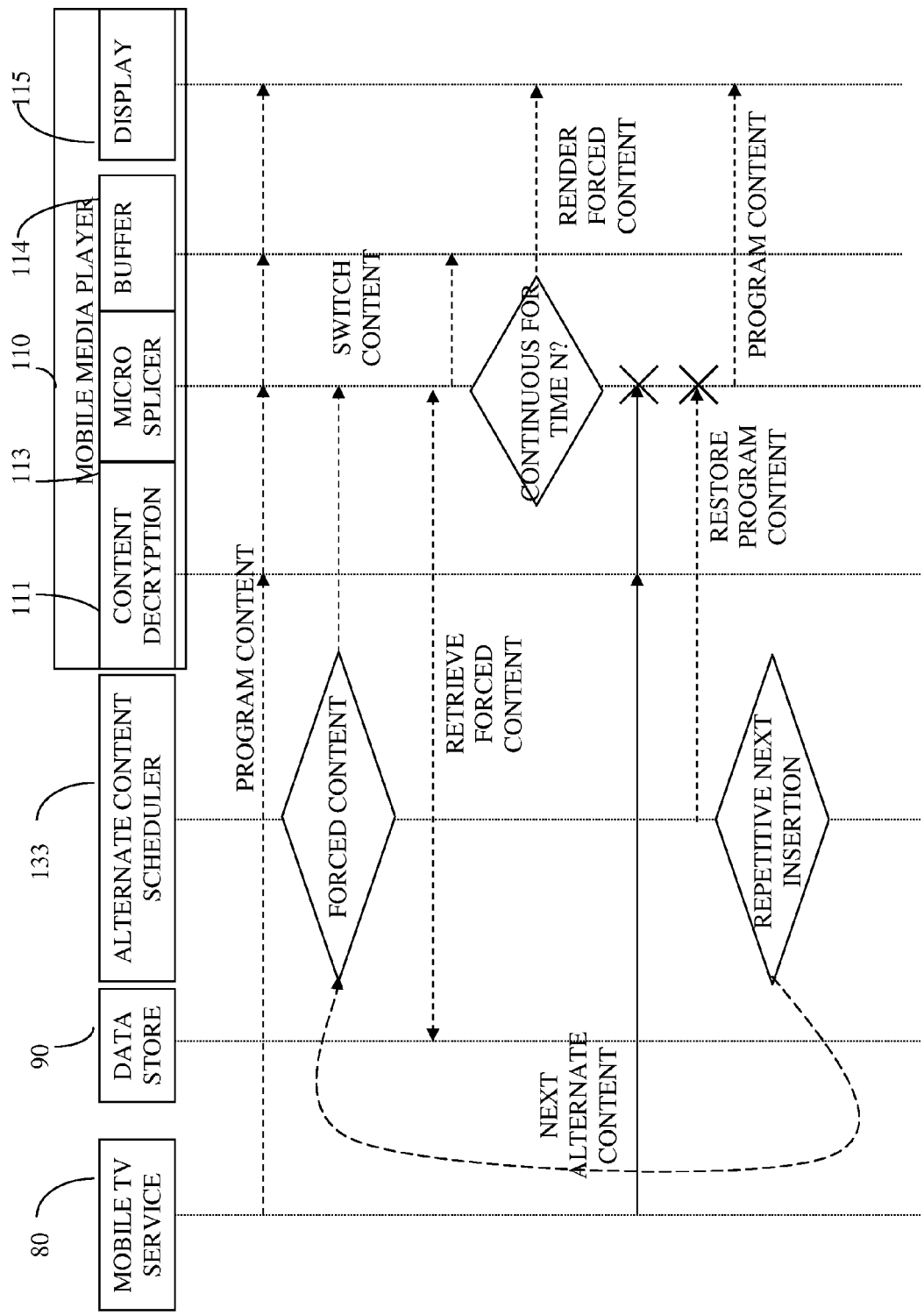
FIG. 6 is a flow diagram showing a scheme for alternate content insertion for forced content according to the invention.

FIG. 6 is an exemplary and non-limiting illustration of an alternate content insertion for forced content according to the invention. The alternate content scheduler 133 has information on the currently viewed program and channel on the mobile handheld device. Forced content, such as emergency notifications or public announcements, can be either downloaded as a file or the network can broadcast the information as a stream. This scenario takes into account both cases, where the alternate content scheduler 133 controls the timing and synchronization aspects of forced content rendering and reverts back to original program content once the alternate content rendering is completed.

1. The mobile media player 110 renders the prior program content.
2. The alternate content scheduler 133 detects the time for inserting forced content into the display 115 and commands the micro-splicer 113 to start rendering alternate content and display the content per rules obtained from the network.
3. The micro-splicer 113 retrieves the alternate content from the information provided in Step 1 above.
4. Alternate content is buffered to the buffer 114.
5. The micro-splicer 113 instructs the rendering engine of the mobile media player 110 to display the alternate forced content, repeating the play of the content continuously as specified by the alternate content scheduler 133.
6. The micro-splicer 113 stops buffering the original program content.
7. The alternate content scheduler 133 detects the end of forced content and commands the micro-splicer 113 to restart original program content rendering.
8. If the alternate forced content must be rendered at network specified intervals, as instructed in the metadata, a timer is started in the alternate content scheduler 133 to render the forced content repetitively.
9. The mobile media player 110 continues rendering the original program content.
10. For repetitive display of forced content, Steps 1 through 8 above are repeated until all repetitions are completed.

Figure 7:
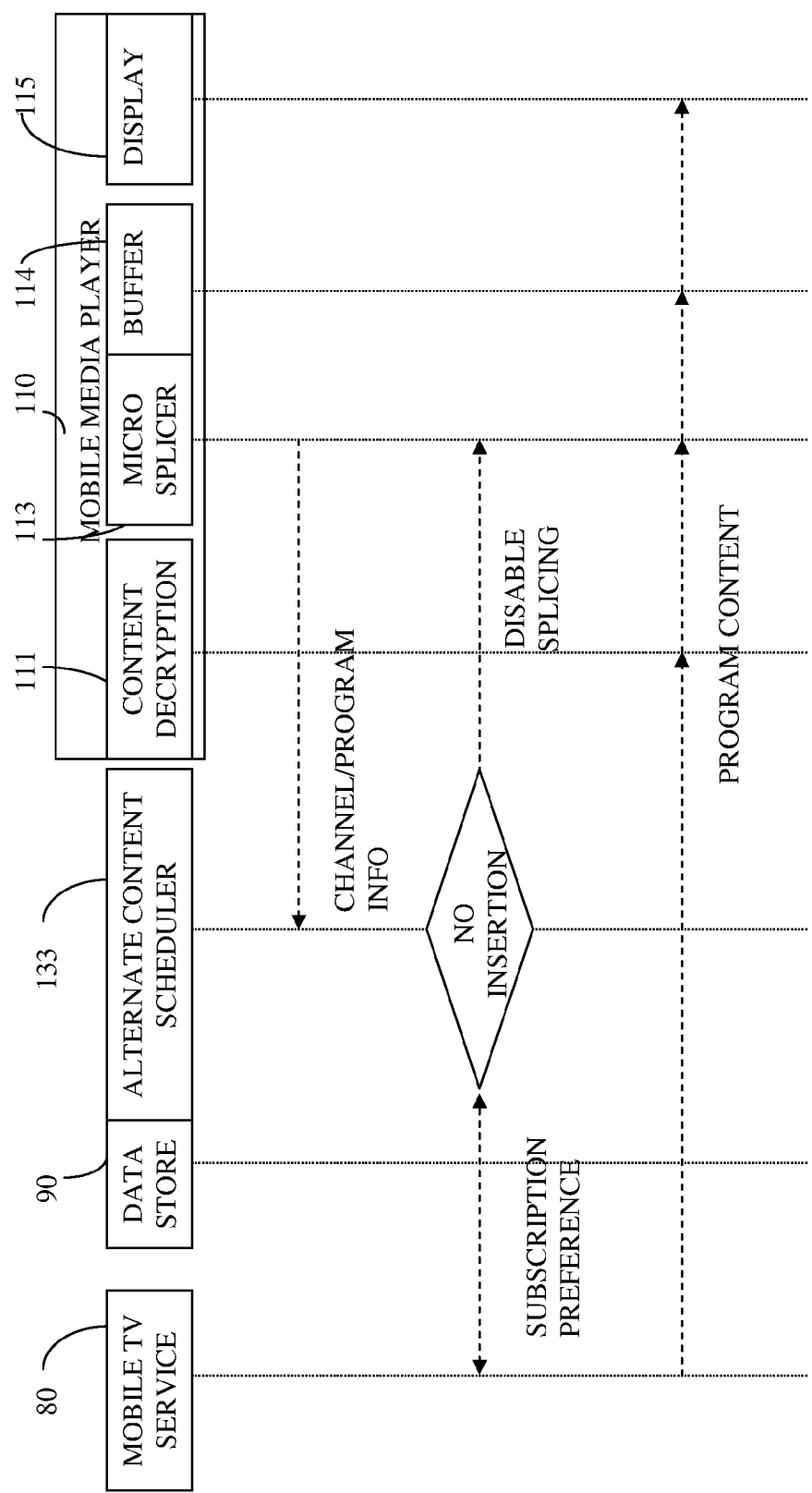
FIG. 7 is a flow diagram showing a scheme for no alternate content insertion according to the invention.

FIG. 7 is an exemplary and non-limiting illustration of a no alternate content insertion scenario according to the invention. If the subscription for the channel as viewed does not qualify for alternate content insertion, the micro-splicer 113 acts as a pipe for original program content rendering. The message flow details are:

1. The micro-splicer 113 provides information about the channel/program content to the alternate content scheduler 133.
2. The alternate content scheduler 133 interacts with the mobile TV service 80 of the mobile handheld device to obtain subscription preferences for the channel being viewed by the user.
3. The alternate content scheduler 133 commands the micro-splicer 113 to disable splicing for the period of the program, as obtained from the subscription preferences.
4. The mobile media player 110 continues rendering the original program content.

Figure 8:
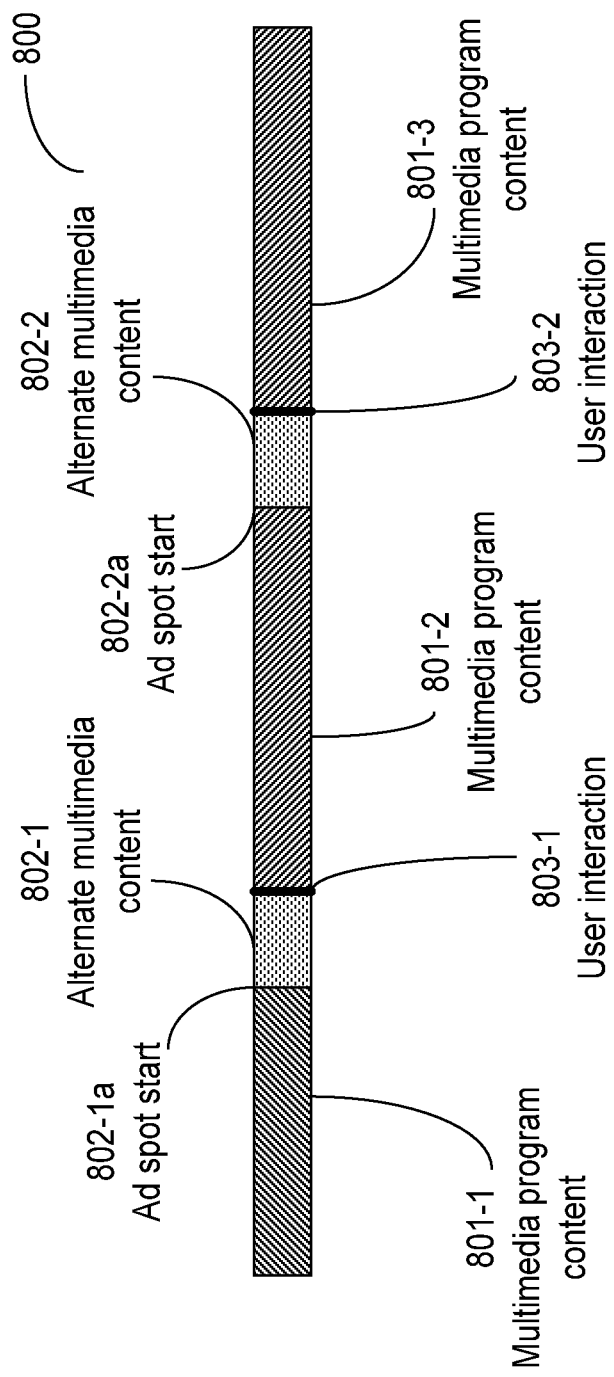
FIG. 8 is a schematic diagram showing the user interaction input from an alternate content display needed by the micro-splicer to continue the content display as a guarantee of user viewing of the alternate content according to the invention.

FIG. 8 is an exemplary and non-limiting diagrammatic representation 800 of the multimedia program content 801-1, 2, and 3 with spot break starts at 802-1a and 802-2a enabling alternate multimedia content switched into spot breaks 802-1 and 2. The necessary user interaction 803-1 and 2 is used as a necessary control signal to generate a user feedback for switching from alternate content buffer to content buffer based on pre-received metadata. The user interactions 803-1 and 2, which may be in the form of answering a query on the screen or clicking on a button on screen, or eye movements recognized using an available built in camera, guarantee the user viewing of the alternate content displayed.

Figure 9:
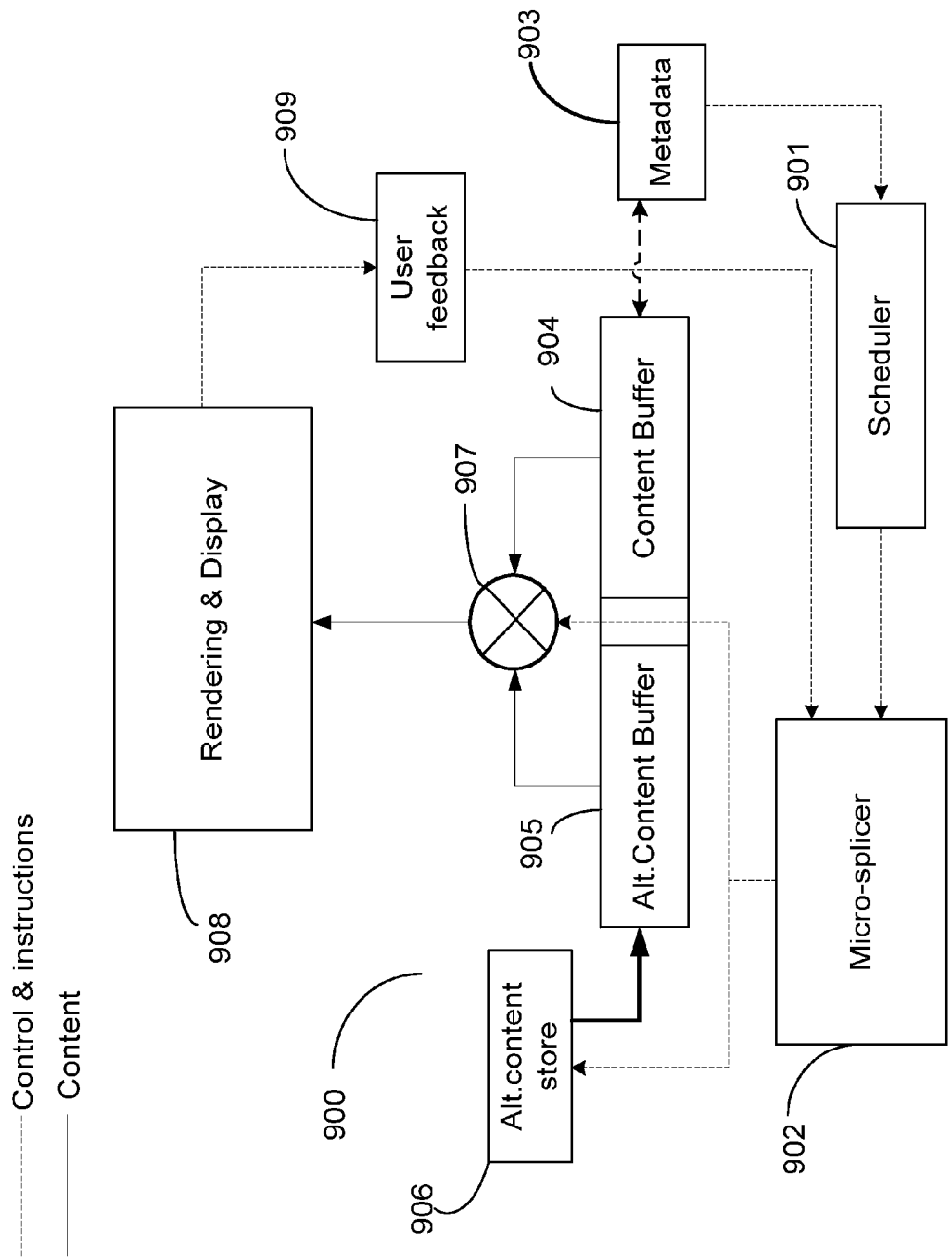
FIG. 9 is a block schematic diagram showing the entities participating in the guaranteed user viewing of alternate content as a requirement for continued multimedia content viewing according to the invention.

FIG. 9 is an exemplary and non-limiting block diagram 900 of an implementation using the scheduler 901 and micro-splicer 902 for guaranteeing a level of customer interaction with alternate content 802-1 and 2 inserted into spot breaks within the multimedia content stream 801-1, 2, and 3.

During viewing of multimedia program content 801-1 from the content buffer 904, a spot break start 802.1a is recognized and metadata for the spot associated with that spot break start 802.1a is made available to the scheduler 901 from the metadata store 903. The scheduler 901 schedules the insertion of an appropriate alternate content 802-1 for the spot and provides the information to the micro-splicer 902. Based on this information the micro-splicer 902 enables the loading of an alternate content buffer 905 with the correct alternate content 802-1 from the alternate content store 906.

The micro-splicer 902 further enables the switch 907 to switch the loading of content, for rendering and display by the rendering and display system 908, from content buffer 904 to alternate content buffer 905, at the appropriate start time of the spot 802-1a. The alternate content 802-1 in the alternate content buffer 905 is then rendered and displayed in the spot 802-1.

During the rendering and display of the alternate content 802-1, to guarantee the viewing and interaction of the alternate content by the user, a predetermined user interaction capability, such as a query on screen to be answered by the viewer or a button displayed on screen to be pressed or a box to be clicked-in, etc is made part of the alternate content 802-1 display. It is also possible to use a built in camera to do facial recognition with eye movement as an alternate to physical interaction requirement, to generate a user interaction 803-1 output. This user interaction 803-1 is an interactive response by the user which is used to produce a user feedback in the user feedback block 909. If the necessary user feedback is received by the micro-splicer 902 before the end of the alternate content 802-1, the micro-splicer enables the switch 907 to change the rendering and display of content from the alternate content buffer 905 to content buffer 904 and, based on the metadata instructions, to display the rest of the multimedia program content 801-2. If the necessary user feedback is not received before the end of the spot 802-1, the micro-splicer 902 puts the rendering and display of alternate content on hold until such time as the user interaction 803-1 happens and user feedback is received. This same process is repeated for spot break 802-2 also. This use of the stop and start capability, based on the user feedback, ensures and guarantees that the user is viewing the alternate content when displayed.

The invention may be implemented as software executing on appropriate hardware, hardware, firmware, or any combination thereof for implementation on the handheld device. Further, such a micro-splicer may be instantiated on devices other than handheld devices to use the capability to guarantee customer viewing of advertisements and alternate content on these devices.

In the current discussion of the invention, the capability of the micro-splicer to respond to signals, generated or input to the handheld device, in conjunction with metadata supplied with content is shown as being used for guaranteeing viewing of the alternate content by the user of the handheld device. This should not be considered as limiting, the use of the built-in capability of the micro-splicer to start and stop applications. Applications using this capability are all covered under this patent application.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A method for inserting alternate content into a presentation while a user is viewing original multimedia content on a handheld device, comprising the steps of:
  providing a buffer on the handheld device configured to receive and store original multimedia content and alternate content prior to viewing said original multimedia content;
  said buffer comprising a content buffer for original multimedia content and an alternate content buffer for alternate content;
  providing a scheduler and a micro-splicer on the handheld device configured to selectively render original multimedia content and alternate content;
  said scheduler configured to receive metadata and command input to confirm user interaction;
  said micro-splicer configured to render said alternate content when metadata identifies an ad spot into which said alternate content is to be placed;
  said micro-splicer configured to revert from rendering said alternate content to rendering said original multimedia content once alternate content rendering is accomplished within said ad spot; and
  using said command input to confirm user interaction with said alternate content and thus ensure viewing of ads comprising said alternate content by said user before said micro-splicer reverts from rendering said alternate content to rendering said original multimedia content;
  wherein said command input to confirm user interaction with said alternate content comprises answering a query displayed on said handheld device with alternate multimedia content.

2. An apparatus for rendering and displaying alternate multimedia content during original multimedia content viewing on a mobile handheld device, comprising:
  a micro-splicer on said handheld device for redirecting multimedia content;
  a buffer on said handheld device, coupled to said micro-splicer, comprising a multimedia content buffer for storing said original multimedia content and an alternate content buffer for storing said alternate multimedia content on said handheld device; and
  a scheduler on said handheld device, coupled to said micro-splicer, for switching between said alternate multimedia content buffer and said original multimedia content buffer for selective rendering and display of said original multimedia content and said alternate content;
  wherein said original multimedia content and said alternate multimedia content are received separately;
  wherein rendering of said alternate multimedia content is synchronized with said original multimedia content by said scheduler;
  wherein instructions for scheduling said alternate multimedia content are provided to said handheld device;
  wherein said instructions comprise both metadata and user feedback generated from user interaction with alternate content during user viewing of said alternate content;
  wherein said user interaction with alternate content comprises answering a query displayed on said handheld device with alternate multimedia content;
  wherein said metadata and said user feedback are provided to said scheduler;
  wherein said scheduler and said micro-splicer only effect switching between said original multimedia content buffer and said alternate content buffer after receipt of said user feedback; and
  wherein said handheld device continues to display said alternate content at the end of said alternate content until said user feedback is received and, only after receiving said user feedback, switches back to said original multimedia content buffer to render said original multimedia content.

3. The apparatus of claim 2, wherein said scheduler uses said micro-splicer to effect switching between said original multimedia content buffer and said alternate content buffer at a precise time and based upon said metadata.

4. The apparatus of claim 2, wherein said scheduler places rendering and display within said handheld device on hold until said user feedback is received.

5. The apparatus of claim 2, wherein said switching is achieved by tandem operation of said micro-splicer and said scheduler.

6. The apparatus of claim 2, wherein said original multimedia content is received live and wherein said alternate multimedia content is pre-stored on said handheld device.

7. The apparatus of claim 2, wherein said original multimedia content and said alternate multimedia content are both pre-stored on said handheld device.

8. The apparatus of claim 2, wherein said alternate multimedia content comprises at least one of an advertisement, an interstitial, a gateway, a bumper, an overlay, an inlay, and forced content.

9. The apparatus of claim 2, wherein said micro-splicer redirects any of program, channel, alternate content metadata, service delivery, and subscription information.

10. The apparatus of claim 2, wherein said scheduler controls switching from said alternate multimedia content to said original multimedia content buffer after completion of said alternate content.

11. A method for inserting alternate multimedia content into original multimedia content on a mobile handheld device, comprising the steps of:
- receiving the alternate multimedia content at said mobile handheld device over a channel;
- storing said received alternate content at said mobile handheld device in an alternate content buffer location in a buffer;
- receiving said original multimedia content and related metadata at said mobile handheld device over said channel;
- storing said received original multimedia content at said mobile handheld device in a content buffer location in said buffer;
- accessing said original multimedia content for rendering and display on said handheld device;
- processing said original multimedia content to detect spot break related metadata;
- upon detection of a spot break, and based on related metadata, accessing said alternate multimedia content from said buffer for rendering and display on said handheld device instead of said original multimedia content;
- accessing said original multimedia content, based on said metadata, once said alternate multimedia content has been rendered and displayed on said handheld device and a pre-defined user feedback, generated from a user interaction with said rendered and displayed alternate multimedia content, has been received;
- providing said pre-defined user feedback and said metadata to a scheduler;
- switching access from said alternate multimedia content to said original multimedia content only after said pre-defined user feedback is received, wherein user viewing of said alternate content is ensured; and
- synchronizing switching of access between said alternate multimedia content and said original multimedia content based on said metadata;
- wherein said pre-defined user feedback comprises answering a query displayed on said mobile handheld device with alternate multimedia content.

12. The method of claim 11, further comprising the step of:
switching access from said alternate multimedia content to said original multimedia content in response to a trigger that results from a metadata indication of a time period that is available for access to said alternate multimedia content.

13. The method of claim 11, wherein said alternate multimedia content comprises an advertisement.

14. The method of claim 11, wherein said alternate multimedia content comprises any of an interstitial, gateway, bumper, overlay, inlay, and forced content.

15. The method of claim 11, wherein said spot break metadata switches any of program, channel, alternate content metadata, service delivery, and subscription information.

16. An apparatus for rendering and displaying alternate multimedia content during original multimedia content viewing on a mobile handheld device, comprising:
- a micro-splicer on said handheld device for redirecting multimedia content;
- a buffer on said handheld device, coupled to said micro-splicer, comprising a multimedia content buffer for storing said original multimedia content and an alternate content buffer for storing said alternate multimedia content on said handheld device; and
- a scheduler on said handheld device, coupled to said micro-splicer, for switching between said alternate multimedia content buffer and said original multimedia content buffer for selective rendering and display of said original multimedia content and said alternate content;
- wherein said original multimedia content and said alternate multimedia content are received separately;
- wherein rendering of said alternate multimedia content is synchronized with said original multimedia content by said scheduler;
- wherein instructions for scheduling said alternate multimedia content are provided to said handheld device;
- wherein said instructions comprise both metadata and user feedback generated from user interaction with alternate content during user viewing of said alternate content;
- wherein said user interaction with alternate content comprises answering a query displayed on said handheld device with alternate multimedia content; and
- wherein said micro-splicer stops and restarts the rendering of original multimedia content or alternate content based receipt of both metadata and user feedback.

\* \* \* \* \*